United States Patent
Grewe et al.

(10) Patent No.: US 6,889,506 B2
(45) Date of Patent: May 10, 2005

(54) GAS AND STEAM TURBINE INSTALLATION

(75) Inventors: Claus Grewe, Essen (DE); Frank Hannemann, Spardorf (DE); Ulrich Schiffers, Eckental (DE)

(73) Assignee: Siemens Aktiengesellschaft, Munich (DE)

( * ) Notice: Subject to any disclaimer, the term of this patent is extended or adjusted under 35 U.S.C. 154(b) by 269 days.

(21) Appl. No.: 10/181,526
(22) PCT Filed: Jan. 5, 2001
(86) PCT No.: PCT/DE01/00024
§ 371 (c)(1),
(2), (4) Date: Jul. 19, 2002
(87) PCT Pub. No.: WO01/53660
PCT Pub. Date: Jul. 26, 2001

(65) Prior Publication Data
US 2003/0000214 A1 Jan. 2, 2003

(30) Foreign Application Priority Data
Jan. 19, 2000 (DE) .......................... 100 02 084

(51) Int. Cl.$^7$ ............................. F02C 3/28; F02C 7/232
(52) U.S. Cl. ...................... 60/781; 60/39.094; 60/39.12
(58) Field of Search ........................... 60/39.094, 39.12, 60/39.182, 39.465, 772, 781

(56) References Cited

U.S. PATENT DOCUMENTS 5,129,222 A    7/1992   Lampe et al.
5,685,138 A  * 11/1997  Rao et al. ...................... 60/781
5,688,296 A   11/1997   Andrus, Jr. et al.

FOREIGN PATENT DOCUMENTS

| DE | 39 16 477 A1 | 11/1990 |
| DE | 43 01 100 A1 | 7/1994 |
| DE | 198 32 294 C1 | 12/1999 |
| EP | 0 379 108 | 7/1990 |
| EP | 0 615 060 B1 | 9/1994 |
| EP | 0 915 240 A1 | 5/1999 |
| EP | 09 392 20 | 9/1999 |
| GB | 2 234 984 A | 2/1991 |
| JP | 55-69731 * | 5/1980 |

OTHER PUBLICATIONS

Japanese Patent English Abstract of 0063295822 AA.
Japanese Patent English Abstract of 0063255531 AA.
Japanese Patent English Abstract of 0055069731 AA.
Huth, M. et al.: "Combustion of synthesis gas in gas turbines"; BWK Brennstoff Wärme Kraft, DE, VDI Verlag GmbH, Düsseldorf, vol. 50, No. 9, Sep. 1, 1998, pp. 35–39, XP 000777542 ISSN: 0006–9612.
Alstom, "IGCC, Integrated Gasification Combined Cycle— IGCC—The Solution to Clean and Efficient Power for Refineries and Power Producers (based on the case history of the API ENERGIA Power Plant in Italy", pp. 2–8.

* cited by examiner

Primary Examiner—Louis J. Casaregola
(74) Attorney, Agent, or Firm—Harness, Dickey & Pierce, P.L.C.

(57) ABSTRACT

A gas and steam turbine installation including a gasification device for fossil fuel. The gasification device and the combustion chamber of the gas turbine are connected by a gas line. A gas lock is connected to the gas line. The gas lock includes a quick acting armature, a pressure discharge or over pressure system and a gas lock armature.

32 Claims, 3 Drawing Sheets

GAS AND STEAM TURBINE INSTALLATION

This application is the national phase under 35 U.S.C. § 371 of PCT International Application No. PCT/DE01/00024 which has an International filing date of Jan. 5, 2001, which designated the United States of America and which claimed priority on German application number DE 100 02 084.4 filed Jan. 19, 2000, the entire contents of which are hereby incorporated by reference.

FIELD OF THE INVENTION

The invention generally relates to a gas and steam turbine installation. More preferably, it relates to one having a waste-heat steam generator, which is connected downstream of a gas turbine on the combustion-gas side and whose heating surfaces are connected into the water/steam circuit of a steam turbine, and having a fuel system, which is connected upstream of the combustion chamber of the gas turbine and has a gasification device for fossil fuel and a gas line, which branches off from the gasification device and opens into the combustion chamber of the gas turbine. In this arrangement, the components provided for gas cleaning are usually connected into the gas line.

BACKGROUND OF THE INVENTION

Such an installation is known, for example, from GB-A 2 234 984 or DE 198 32 294 C1.

In order to reduce the pollutant emission during the combustion of the gasified fossil fuel or synthesis gas, a saturator, in which the synthesis gas is charged with steam during operation of the installation, can be connected into the gas line. For this purpose, the synthesis gas flows through the saturator in counter-flow to a flow of water, which is guided in a water circuit designated as a saturator circuit. In this arrangement, an input of heat from the water/steam circuit into the saturator circuit is provided for particularly high efficiency.

Due to the contact in the saturator with the heated flow of water guided in the saturation circuit, the gasified fuel is saturated with steam and experiences heating to a limited extent. For thermal technology reasons, and also for operational reasons, a further heating of the fuel by means of a heat exchanger can be necessary before its supply to the combustion chamber of the gas turbine.

In order to ensure particularly safe operation of the gas and steam turbine installation, it should be possible to stop a supply of the synthesis gas to the combustion chamber of the gas turbine at any time. For this purpose, a quick-action valve is usually connected into the gas line before the combustion chamber. If required, the quick-action valve blocks the gas line in a particularly short time so that no synthesis gas can reach the combustion chamber associated with the gas turbine.

Because of the relevant technical safety regulations, the fuel system usually includes a gas lock. A gas lock includes two valves, for example ball cocks, which have to be opened or closed for a through-flow of gas. An intermediate relief system or a pressure line is connected between these two valves. The intermediate relief system can be connected to a flare by which the surface gas can be burned off.

As an alternative to the intermediate relief system, it is possible to connect the pressure line, which ensures that no gas can flow in via the gas lock valves. The gas lock therefore separates, in a gas-tight manner, the fuel system into a first region; or the gasification system, upstream of the gas lock and into a second region; or the so-called gas turbine fuel system, downstream of the gas lock. Such a gas lock is known, for example, from Huth, M. et al.: "Combustion of synthesis gas in gas turbines"; BWK Brennstoff Wärme Kraft, DE, VDI Verlag GmbH, Düsseldorf, Vol. 50, No. 9, 09.01.1998, pp. 35–39, XP 000777542 ISSN: 0006–9612.

A gas and steam turbine installation with a gasification device can be operated both with the synthesis gas, which is for example generated from coal or residual oil, and with a second fuel, such as natural gas. In the case of a change from synthesis gas to the second fuel, or vice versa, it is necessary for safety technology reasons to flush the region between the gas lock and the combustion chamber, i.e. the gas turbine fuel system, with an inert medium such as nitrogen or steam. Because of the large volume of the region to be flushed, which in the appropriate case also includes the heat exchanger, flushing of this region is then required in both the forward and the rearward direction. This is done in order to achieve an almost complete displacement of the synthesis gas or of the second fuel and entering combustion gas, if necessary, out of the gas turbine fuel system.

Flushing with pure nitrogen, however, is found to be uneconomic because of the magnitude of the volume to be flushed. Flushing with steam, on the other hand, presupposes the provision of steam so that the flushing procedure is, as a rule, dependent on the operation of the waste-heat steam generator of the steam turbine installation. In this arrangement, furthermore, either cooling of the steam extracted from the waste-heat steam generator or protection of the components from particularly high steam temperatures is necessary. This is done so that the preparation for the flushing procedure is associated with a high level of complexity. In addition, complicated dewatering systems are necessary and the systems exposed to steam have to be protected from corrosion.

The flushing concept, which comprises forward and rearward flushing, leads to a complex control concept during the flushing operation and to particularly complicated control modes for the operation of the installation. Such a flushing concept also leads to relatively long installation run-up and run-down times.

SUMMARY OF THE INVENTION

An embodiment of the invention is based on an object of specifying a gas and steam turbine installation of the type mentioned above in which, in the case of a change in the gas supplied to the combustion chamber of the gas turbine, the fuel system can be flushed in a particularly simple manner. A method may also be specified, which permits flushing of the fuel system of the gas and steam turbine installation in a particularly short time and in a particularly simple manner.

An object directed toward the gas and steam turbine installation can be achieved, according to an embodiment of the invention, by a gas lock being connected into the gas line, the gas lock being arranged upstream of the combustion chamber and including a quick-action lock valve, a flushing line for steam-free flushing opening into the gas line downstream of the gas lock valve.

An embodiment of the invention can be based on the consideration that, in the case of a change to the gas to be supplied to the combustion chamber of the gas turbine, a displacement of the synthesis gas or of the second fuel, and combustion gas if necessary, from the fuel system can then be ensured in a particularly reliable manner if the volume to be flushed is small. In the case of a volume to be flushed which is small, furthermore, flushing in only one direction is found to be sufficient so that it is possible to dispense with complex control mechanisms for the flushing procedure. The flushing then takes place in the forward direction only, i.e. into the combustion chamber of the gas turbine.

The flushing procedure can now be alternatively carried out with steam or nitrogen, for example pure nitrogen. Flushing with nitrogen is economic because of the small volume to be flushed. In addition, it is not then necessary to extract steam from the steam turbine installation for the flushing procedure, so that the overall efficiency of the gas and steam turbine installation is found to be particularly high. In addition, the system dispenses with the use of highly alloyed steels because no corrosion phenomena, or only slight corrosion phenomena, can appear.

A small volume to be flushed can be achieved by a compact arrangement of the components. If the gas lock and the quick-action valve are arranged adjacent to one another, the quick-action valve can take over the function of one of the valves provided in the gas lock, so that this valve can be dispensed with and the volume of the gas turbine fuel system to be flushed is found to be particularly small.

Ball cocks or ball valves, which exhibit a high level of gas-tightness, are usually employed as the valves for the gas lock. The quick-action valve is usually embodied as a quick-action flap. Depending on the size of the valve, however, any other rapidly closing fitting, such as a suitable valve, can be employed for this purpose.

In an advantageous embodiment of the invention, a heat exchanger (which, if appropriate, is connected into the gas line) is connected upstream of the gas lock. This also reduces the volume to be flushed in the gas turbine fuel system. The primary side of the heat exchanger can, for example, be connected into the gas line between the gasification device and a saturator, which is likewise arranged upstream of the gas lock.

With this arrangement, the heat exchanger transfers heat from the synthesis gas flowing to the saturator into the synthesis gas flowing from the saturator. Such a heat exchanger, which is also designated as a synthesis gas heat exchanger, therefore effects an at least partial thermal bypass of the saturator, so that the thermodynamic losses of the overall process are kept particularly small due to the heating of the synthesis gas by the synthesis gas. A particularly favorable heat exchange can be achieved by such an arrangement because—under the boundary condition of constant final temperature—a comparatively large quantity of heat can be transferred to the synthesis gas flowing out of the saturator.

Other embodiments are, of course, also conceivable as alternatives for the connection of the heat exchanger, such as the admission of hot feed water or steam in order to preheat the synthesis gas.

In order to mix the synthesis gas with nitrogen, a mixing appliance can be connected into the gas line upstream of the saturator provided for admitting steam to the synthesis gas. The addition of nitrogen to the synthesis gas is carried out to maintain particularly low $NO_x$ limiting values during the combustion of the synthesis gas.

A flushing line advantageously opens into the gas line immediately downstream of the gas lock valve. This ensures reliable flushing of the fuel system between the gas lock valve and the combustion chamber. Due to the compact construction of the fuel system, the flushing quantities necessary are found to be particularly small so that the operation of the installation is particularly economic. The employment of nitrogen or another inert medium for flushing the fuel system is particularly advantageous in comparison with flushing with steam because no dewatering of the line system, such as in the case of flushing with steam, is necessary. In addition, nitrogen or another inert medium can be made available independently of the operation of the water/steam system. In addition, nitrogen or the inert medium has a low temperature compared with steam extracted from the installation, so that it is possible to dispense with protection of the components from impermissibly high steam temperatures.

Furthermore, there is no susceptibility to corrosion, or only slight susceptibility to corrosion, so that it is not necessary to employ highly alloyed steel. In principle, however, it is also possible to flush with steam, if available. In the case of nitrogen flushing, or flushing with some other inert medium apart from steam, an intermediate reservoir is advantageous. The intermediate reservoir ensures flushing even in the case of the failure of the system for providing the inert medium.

For almost complete conversion of the fossil fuel in the gasification device at high temperatures, a supply of oxygen from the air separation installation is usually provided. Nitrogen is then obtained. This nitrogen, in particular the pure nitrogen obtained, can now be used for flushing. For this purpose, the intermediate reservoir is advantageously connected via a supply line to the air separation installation.

A reserve line, which is connected at the inlet end to an emergency filling system for nitrogen, in particular pure nitrogen, advantageously opens into the supply line leading away from the air separation installation. This ensures, in a particularly reliable manner, flushing of the fuel system with nitrogen, in particular pure nitrogen, even in the case of the failure of the air separation installation.

The flushing system with intermediate reservoir, which is connected to an air separation installation if appropriate, can furthermore be employed even without the specific embodiment, presented above, of the gas lock in a gas and steam turbine installation.

With respect to the method for flushing the fuel system of a gas and steam turbine installation, an object may be achieved, according to an embodiment of the invention, by the fuel system being flushed in the forward direction between the gas lock and the combustion chamber, i.e. in the direction of the combustion chamber. With only a forward flushing operation, the times for flushing are found to be particularly low, so that the change from synthesis gas to second fuel takes place in a particularly economic manner.

If nitrogen is provided for flushing, this is advantageously extracted from the air separation installation. For this purpose, the nitrogen generated in the air separation installation, in particular as pure nitrogen, is supplied to the intermediate reservoir via the supply line. The pure nitrogen can then be fed, as required, from the intermediate reservoir into the gas line for flushing the fuel system.

The fuel system is advantageously flushed between the combustion chamber and the gas lock in the forward direction using an inert flushing medium, which is supplied between the gas lock valve and the control valve. As in the case of the gas turbine fuel system, the gasification system must be flushed, because of the safety technology regulations, with an inert medium between the gasification device and the gas lock. For this purpose nitrogen, in particular pure nitrogen, or steam at the necessary pressure level, is usually employed as the inert medium. The concept and the boundary conditions for the flushing procedure depend on the gasification method employed.

BRIEF DESCRIPTION OF THE DRAWINGS

An exemplary embodiment of the invention is explained in more detail using the drawings, wherein.

DETAILED DESCRIPTION OF THE PREFERRED EMBODIMENTS

Figure 1A:
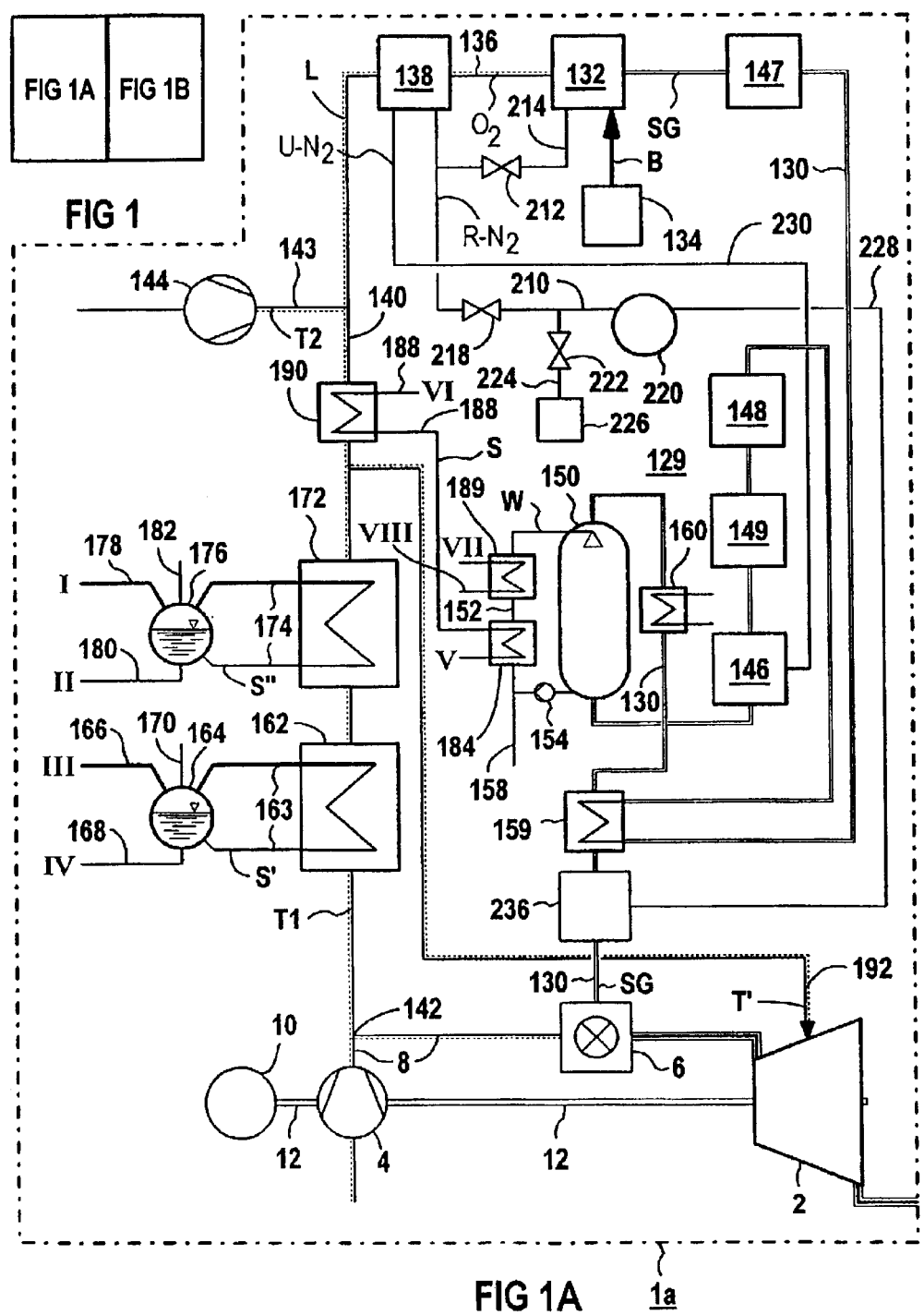
FIGS. 1A and 1B show a gas and steam turbine installation, a fuel system with a gasification device being connected upstream of the gas turbine.
Figure 1B:
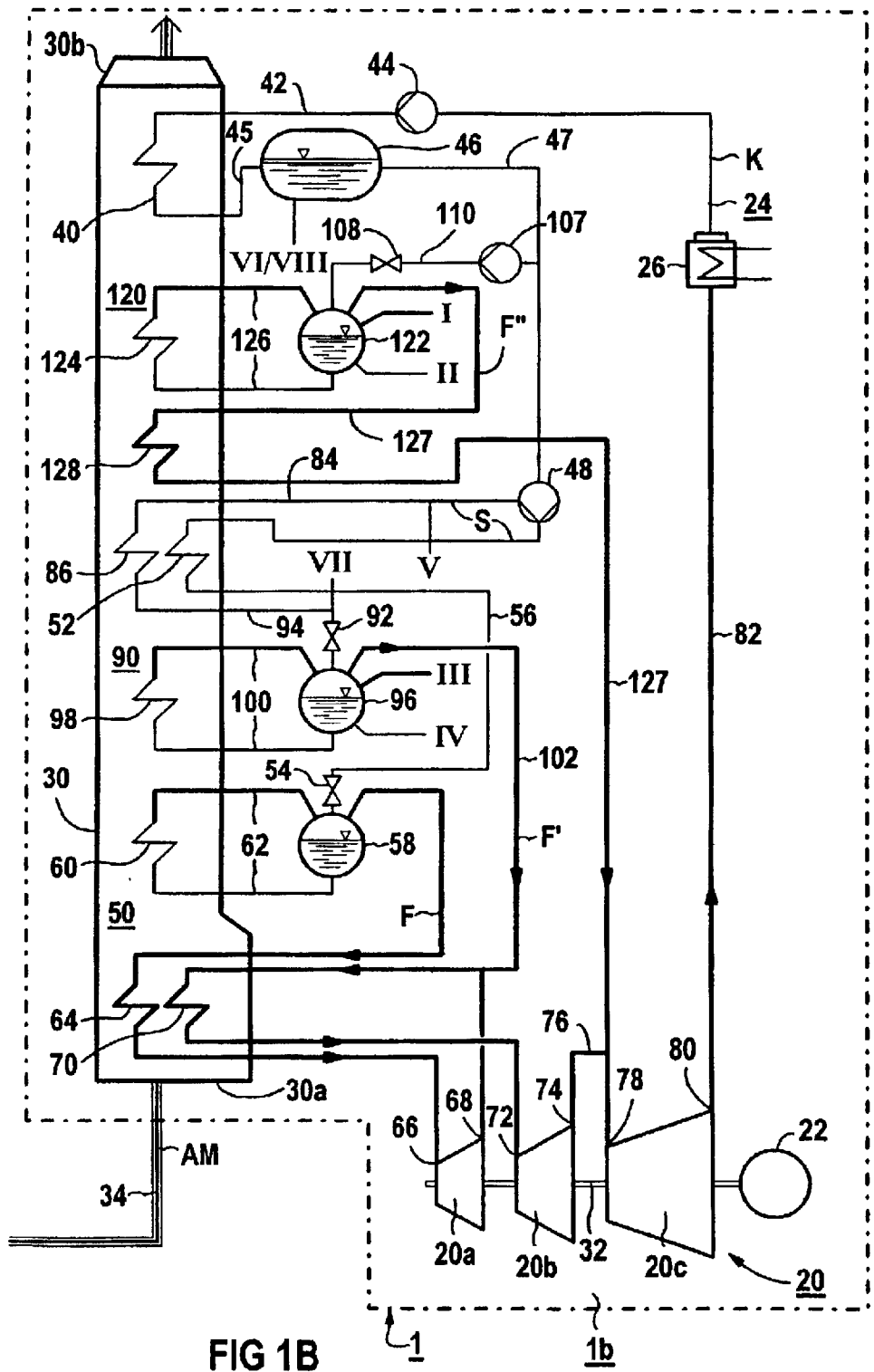

The gas and steam turbine installation 1 shown in the figure includes a gas turbine installation 1a and a steam turbine installation 1b. The gas turbine installation 1a includes a gas turbine 2 with coupled air compressor 4 and a combustion chamber 6, which is connected upstream of the gas turbine 2 and is connected to a compressed air line 8 of the compressor 4. The gas turbine 2 and the air compressor 4, together with a generator 10, are seated on common shaft 12.

The steam turbine installation 1b includes a steam turbine 20 with coupled generator 22 and, in a water/steam circuit 24, a condenser 26, connected downstream of the steam turbine 20, and a waste-heat steam generator 30. The steam turbine 20 includes a first pressure stage or a high-pressure part 20a and a second pressure stage or a medium-pressure part 20b, together with a third pressure stage or a low-pressure part 20c, which drive the generator 22 via a common shaft 32.

In order to supply working medium AM, or combustion gas, which has been expanded in the gas turbine 2, to the waste-heat steam generator 30, an exhaust gas line 34 is connected to an inlet 30a of the waste-heat steam generator 30. The expanded working medium AM from the gas turbine 2 leaves the waste-heat steam generator 30 via its outlet 30b in the direction of a chimney (not shown in any more detail).

The waste-heat steam generator 30 comprises a condensate pre-heater 40, which can be fed at the inlet end with condensate K from the condenser 26 via a condensate line 42, into which is connected a condensate pump unit 44. At the outlet end, the condensate pre-heater 40 is connected via a line 45 to a feed-water tank 46. In order to bypass the condensate pre-heater 40, as required, the condensate line 44 can, in addition, be directly connected to the feed-water tank 46 via a bypass line (not shown). The feed-water tank 46 is connected, via a line 47, to a high-pressure feed pump 48 with medium-pressure extraction.

The high-pressure feed pump 48 brings the feed water S flowing out of the feed-water tank 46 to a pressure level suitable for a high-pressure stage 50, of the water/steam circuit 24, associated with the high-pressure part 20a of the steam turbine 20. The feed water S at high pressure can be supplied to the high-pressure stage 50 via a feed-water pre-heater 52, which is connected at the outlet end to a high-pressure drum 58 via a feed-water line 56 which can be shut off by a valve 54. The high-pressure drum 58 is connected to a high-pressure evaporator 60 arranged in the waste-heat steam generator 30 for the formation of a water/steam circulation 62. For the removal of live steam F, the high-pressure drum 58 is connected to a high-pressure super-heater 64 arranged in the waste-heat steam generator 30, which high-pressure super-heater 64 is connected at the outlet end to the steam inlet 66 of the high-pressure part 20a of the steam turbine 20.

The steam outlet 68 of the high-pressure part 20a of the steam turbine 20 is connected via a re-heater 70 to the steam inlet 72 of the medium-pressure part 20b of the steam turbine 20. The steam outlet 74 of the latter is connected via a transfer line 76 to the steam inlet 78 of the low-pressure part 20c of the steam turbine 20. The steam outlet 80 of the low-pressure part 20c of the steam turbine 20 is connected via a steam line 82 to the condenser 26, so that a closed water/steam circuit 24 is produced.

In addition, a branch line 84 branches off from the high-pressure feed pump 48 at an extraction station at which the condensate K has achieved a medium pressure. This branch line 84 is connected via a further feed-water pre-heater 86 or medium-pressure economizer to a medium-pressure stage 90 of the water/steam circuit associated with the medium-pressure part 20b of the steam turbine 20. For this purpose, the second feed-water pre-heater 86 is connected, at the outlet end, via a feed-water line 94, which can be shut off by a valve 92, to a medium-pressure drum 96 of the medium-pressure stage 90. The medium-pressure drum 96 is connected to a heating surface 98, which is arranged in the waste-heat steam generator 30 and is configured as a medium-pressure evaporator, in order to form a water/steam circulation 100. For the removal of the medium-pressure live steam F', the medium-pressure drum 96 is connected via a steam line 102 to the re-heater 70, and therefore to the steam inlet 72 of the medium-pressure part 20b of the steam turbine 20.

A further line 110, which is provided with a low-pressure feed pump 107 and which can be shut off by a valve 108, branches from the line 47, which line 110 is connected to a low-pressure stage 120, of the water/steam circuit 24, associated with the low-pressure part 20c of the steam turbine 20. The low-pressure stage 120 comprises a low-pressure drum 122, which is connected to a heating surface 124, which is arranged in the waste-heat steam generator 30 and is configured as a low-pressure evaporator, in order to form a water/steam circulation 126. In order to remove low-pressure live steam F''', the low-pressure drum 122 is connected to the transfer line 76 via a steam line 127, into which is connected a low-pressure super-heater 128. The water/steam circuit 24 of the gas and steam turbine installation 1 therefore includes, in the embodiment example, three pressure stages 50, 90 and 120. As an alternative, however, fewer, in particular two, pressure stages can be provided.

The gas turbine installation 1a is designed for operation with a gasified raw gas or synthesis gas SG, which is generated by the gasification of a fossil fuel B. As the synthesis gas, gasified coal or gasified oil can, for example, be provided. For this purpose, the gas turbine installation 1a includes a fuel system 129, via which synthesis gas can be supplied to the combustion chamber 6 of the gas turbine 4. The fuel system 129 includes a gas line 130, which connects a gasification device 132 to the combustion chamber 6 of the gas turbine. Coal, natural gas or oil can be supplied as the fossil fuel B to the gasification device 132 via a charging system 134. The gasification system 129 includes, furthermore, components which are connected into the gas line 130 between the gasification device 132 and the combustion chamber 6 of the gas turbine 2.

In order to provide the oxygen $O_2$ necessary for the gasification of the fossil fuel B, an air separation installation 138 associated with the gasification system 129 is connected upstream of the gasification device 132 via an oxygen line 136. An airflow L, which includes a first partial flow T1 and a second partial flow T2, can be admitted at the inlet end to the air separation installation 138. The first partial flow T1 can be extracted from the air compressed in the air compressor 4.

For this purpose, the air separation installation 138 is connected at the inlet end to an extraction air line 140, which branches off from the compressed air line 80 at a branch station 142. In addition, a further air line 143 opens into the extraction air line 140, into which further air line 143 an additional air compressor 144 is connected and via which further air line 143 the second partial flow T2 can be supplied to the air separation installation 138.

In the embodiment example, therefore, the total airflow L flowing to the air separation installation 138 is composed of the partial flow T1 branched off from the compressed air line 8 and the airflow T2 supplied from the additional air compressor 144. Such a connection concept is also designated a partially integrated installation concept. In an alternative embodiment, the so-called fully-integrated installation concept, it is possible to dispense with the further air line 143 together with the additional air compressor 144, so that the air feed to the air separation installation 138 takes place completely by the partial flow T1 extracted from the compressed air line 8.

The nitrogen $N_2$, which is-recovered in addition to the oxygen $O_2$ in the air separation installation 138 during the separation of the airflow L, is supplied via a nitrogen line 145, which is connected to the air separation installation 138, to a mixing appliance 146 and is there added to the synthesis gas SG. In this arrangement, the mixing appliance 146 is configured for particularly uniform and streak-free mixing of the nitrogen $N_2$ with the synthesis gas SG.

The synthesis gas SG flowing away from the gasification device 132 initially passes, via the gas line 130, into a synthesis gas waste-heat steam generator 147, in which a cooling of the synthesis gas SG takes place by heat exchange with a flow medium. High-pressure steam generated during this heat exchange is supplied, in a manner not shown in any further detail, to the high-pressure stage 50 of the water/steam circuit 24.

After the synthesis gas waste-heat steam generator 147 and before a mixing appliance 146, viewed in the flow direction of the synthesis gas SG, a dust removal device 148 for the synthesis gas SG and a desulfurization installation 149 are connected into the gas line 130. In an alternative embodiment, a soot washing appliance can also be provided instead of the dust removal device 148, in particular in the case of gasification of oil as the fuel.

Charging of the gasified fuel with steam before entry into the combustion chamber 6 is provided for particularly low pollutant emission during the combustion of the gasified fuel in the combustion chamber 6. In a particularly advantageous manner from the point of view of heat technology, this can take place in a saturator system. For this purpose, a saturator 150, in which the gasified fuel is guided in counterflow to the heated saturator water, is connected into the gas line 130. In this arrangement, the saturator water circulates in a saturator circuit 152, which is connected to the saturator 150 and into which are connected a circulating pump 154 and for preheating the saturator water, a heat exchanger 156. In this arrangement, preheated feed water from the medium-pressure stage 90 of the water/steam circuit 24 is admitted to the primary side of the heat exchanger 156. In order to compensate for the saturator water losses occurring during the saturation of the gasified fuel, a feed line 158 is connected to the saturator circuit 152.

The secondary side of a heat exchanger 159 acting as synthesis-gas/mixed-gas heat exchanger is connected into the gas line 130 behind the saturator 150, viewed in the flow direction of the synthesis gas SG. In this arrangement, the primary side of the heat exchanger 159 is likewise connected into the gas line 130 at a position before the dust removal installation 148, so that the synthesis gas SG flowing to the dust removal installation 148 transfers a part of its heat to the synthesis gas SG flowing away from the saturator 150. In this arrangement, it is also possible to,provide guidance of synthesis gas SG via the heat exchanger 159 before its inlet into the desulfurization installation 149 even in the case of a connection concept which is modified with respect to the other components. In the case of the connection of a soot washing device, in particular, the synthesis gas side of the heat exchanger can be preferably arranged downstream of the soot washing device.

The secondary side of a further heat exchanger 160 is connected into the gas line 130 between the saturator 150 and the heat exchanger 159, the primary side of which heat exchanger 160 can be heated by feed water or also by steam. Particularly reliable preheating of the synthesis gas SG flowing to the combustion chamber 6 of the gas turbine 2 is ensured by means of the heat exchanger 159, which is configured as a synthesis-gas/pure-gas heat exchanger, and the heat exchanger 160, even in the case of different operating conditions of the gas and steam turbine installation 1.

In order to cool the partial flow T1 of compressed air, also designated extraction air, to be supplied to the air separation installation 138, the primary side of a heat exchanger 162 is connected into the extraction air line 140, the secondary side of which heat exchanger 162 is configured as a medium-pressure evaporator for a flow medium S'. The heat exchanger 162 is connected to a water/steam drum 164, which is configured as a medium-pressure drum, in order to form an evaporator circulation 163. The water/steam drum 164 is connected, via lines 166, 168, to the medium-pressure drum 96 associated with the water/steam circulation 100. As an alternative, however, the secondary side of the heat exchanger 162 can also be directly connected to the medium-pressure drum 96.

In the embodiment example, therefore, the water/steam drum 164 is directly connected to the heating surface 98, which is configured as a medium-pressure evaporator. A feed-water line 170 is, in addition, connected to the water/steam drum 164 for make-up feed of evaporated flow medium S'.

A further heat exchanger 172, whose secondary side is configured as a low-pressure evaporator for a flow medium S", is connected into the extraction air line 140 after the heat exchanger 162, viewed in the flow direction of the partial flow T1 of compressed air. In this arrangement, the heat exchanger 172 is connected to a water/steam drum 176, which is configured as a low-pressure drum, in order to form an evaporator circulation 174.

In the embodiment example, the water/steam drum 176 is connected, via lines 178, 180, to the low-pressure drum 122 associated with the water/steam circulation 126 and is therefore directly connected to the heating surface 124, which is configured as a low-pressure evaporator. As an alternative, however, the water/steam drum 176 can also be connected in another appropriate manner, it being possible to supply the steam extracted from the water/steam drum 176 to an auxiliary consumption unit as processed steam and/or as heating steam. In a further alternative embodiment, the secondary side of the heat exchanger 172 can also be directly connected to the low-pressure drum 122. The water/steam drum 176 is, in addition, connected to a feed-water line 182.

The evaporator circulations 163, 174 can be respectively configured as forced circulations, the circulation of the flow media S' and S" being respectively ensured by a circulating pump and the flow medium S', S" being at least partially evaporated in the heat exchanger 162 or 172, which heat exchangers are configured as evaporators. In the embodiment example, however, both the evaporator circulation 163 and the evaporator circulation 174 are respectively configured for natural circulation, the circulation of the flow medium S' and S" being ensured by the pressure differences arising during the evaporation process and/or by the geodetic arrangement of the respective heat exchangers 162 and 172 and the respective water/steam drums 164 and 176. In this embodiment, only one circulating pump of comparatively small dimensions (not shown) is respectively connected into the evaporator circulation 163 and into the evaporator circulation 174 for starting the system.

In order to input heat into the saturator circuit 152, a saturator-water heat exchanger 184 is provided in addition to the heat exchanger 156, to which is admitted feed water branched off after the feed-water pre-heater 86; feed water S from the feed-water tank 46 is admitted to the primary side of the saturator-water heat exchanger 184. For this purpose, the primary side of the saturator-water heat exchanger 184 is connected, at the inlet end, via a line 186, to the branch line 84 and, at the outlet end, via a line 188, to the feed-water tank 46. In order to reheat the cooled feed water S flowing away from the saturator-water heat exchanger 184, an additional heat exchanger 190, whose primary side is connected into the extraction air line 140 downstream of the heat exchanger 172, is connected into the line 188. Such an arrangement can achieve a particularly high heat recovery from the extraction air and, therefore, a particularly high efficiency of the gas and steam turbine installation 1.

A cooling air line 192 branches off from the extraction air line 140 between the heat exchanger 172 and the heat exchanger 190, viewed in the flow direction of the partial flow T1, by which cooling air line 192 a partial quantity T' of the cooled partial flow T can be supplied to the gas turbine 2 as cooling air for blade/vane cooling.

A flushing operation is necessary when running down the fuel system 129. This takes place in such a way that, in one or more steps, a first and a second region of the fuel gasification system 129 are separately flushed with nitrogen. The gasification system or the first region and the gas turbine fuel system—or the second region are then separated from one another by a gas lock 200 in the region 236. In this arrangement, the gasification system comprises the gasification device 132 as far as the gas lock 200 and the gas turbine fuel system comprises the gas lock 200 and the components connected downstream, as far as the combustion chamber 6 of the gas turbine 2.

Figure 2:
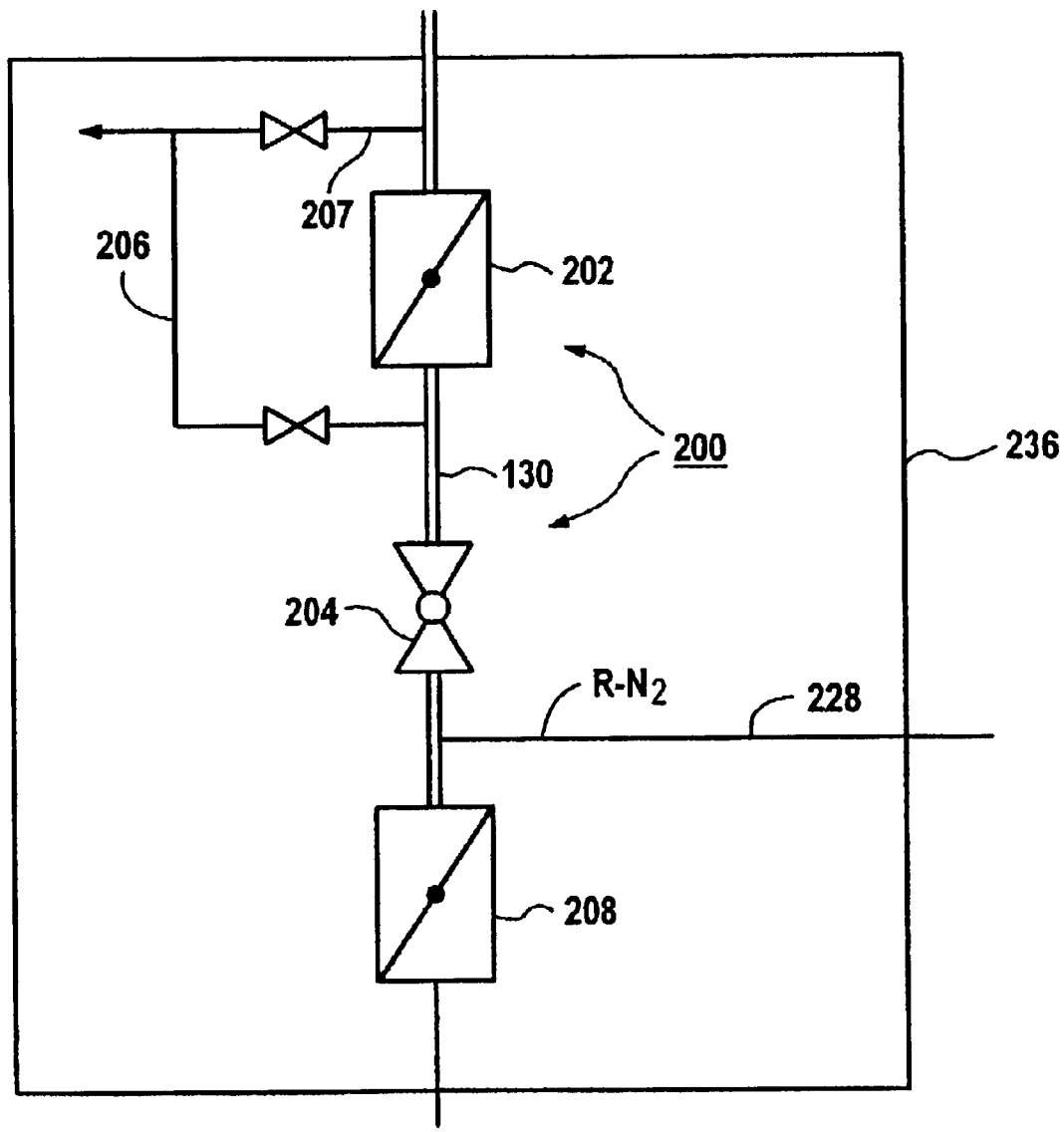
FIG. 2 shows an excerpt from FIG. 1.

The gas lock 200 is represented in detail in FIG. 2 (an enlarged representation of the region 236) and is arranged in the gas line 130, which may be seen in FIG. 1A. The gas lock 200 is arranged in the gas line 130 after the heat exchanger 159. The gas lock comprises a quick-action valve 202, which is arranged in the gas line 130 and which is connected immediately downstream of a gas lock-valve 204 embodied as a ball cock. Residual gas from the flushing operation, after the switching off of the gasification device or after the flushing of the saturator and the downstream heat exchanger, is led away via the exhaust gas line 207 upstream of the gas lock valve 202 to a flare. The exhaust gas line 207, with associated valve, is used as a pressure relief system 206 for the gas lock. The gas line 130 can be shut off in a gas-tight manner by means of the gas lock 200 and, if required, can be closed in a particularly short time via the quick-action valve 202.

The gas lock 200 is connected immediately downstream of a control valve 208, which is connected into the gas line 130 and by which the fuel flow to the gas turbine is controlled in all load cases.

Pure nitrogen $R\text{-}N_2$ from the air separation installation 138 is provided for flushing the gasification system or the first region of the fuel system with nitrogen $N_2$, i.e. from the gasification device 132 to the gas lock 200. For this purpose, the nitrogen $N_2$ generated in addition to oxygen $O_2$ during the separation of the airflow L in the air separation installation 138 is removed from the air separation installation 138 as pure nitrogen $R\text{-}N_2$ via a supply line 210. A branch line 214, which can be shut off by a valve 212 and which opens into the gasification device 132 for fossil fuel B in order to flush the first region of the fuel system 129, branches off from the first supply line 210.

Pure nitrogen $R\text{-}N_2$ is likewise provided as the flushing medium for flushing the second region, or the gas turbine fuel system 129, with nitrogen $N_2$. For this purpose, the supply line 210 opens into a nitrogen reservoir 220. A reserve line 224, which can be shut off by a valve 222 and which is connected at the inlet end to an emergency filling system 226 for pure nitrogen $R\text{-}N_2$, also opens into the supply line 210. Because the nitrogen reservoir 220 is connected both to the air separation installation 138 and to the emergency filling system 226, it can be charged both with pure nitrogen $R\text{-}N_2$ from the air separation installation 138 and with pure nitrogen $R\text{-}N_2$ from the emergency filling system 226.

Flushing of the gasification system 129 is therefore ensured particularly reliably even in the case of a failure of the air separation installation 138. In this arrangement, the nitrogen reservoir 226 is dimensioned in such a way that it covers the pure nitrogen $R\text{-}N_2$ requirement for the flushing procedure, including a sufficiently high reserve capacity. The nitrogen reservoir 226 is connected, at the outlet end, to the gas line 130 via a nitrogen line 228. The nitrogen line 228 opens into the gas line 130 downstream of the synthesis gas SG immediately after the gas lock 200, i.e. after the gas lock valve 204.

A second supply line 230, which opens into the mixing appliance 146, branches off from the air separation installation 138 for supplying impure nitrogen $U\text{-}N_2$ generated in the air separation installation 138. The impure nitrogen $U\text{-}N_2$ is added to the synthesis gas SG in the mixing appliance 146 to reduce the $NO_x$ emissions from the gas turbine. In this arrangement, the mixing appliance 146 is configured for particularly uniform and streak-free mixing of the nitrogen $N_2$ with the synthesis gas SG.

Flushing of the gas turbine fuel system 129 with nitrogen is provided on each change of charge to the gas turbine 4 from synthesis gas SG to second fuel, which corresponds to a change in the fuel gas supplied to the combustion chamber 6. For safety technology reasons, the synthesis gas SG present in the gas turbine fuel system must be almost completely displaced by the flushing process.

Pure nitrogen $R\text{-}N_2$ is fed into the gasification device 132 via the supply line 210 and the branch line 214 in order to flush the first region of the fuel system 129 or the gasification system with pure nitrogen $R\text{-}N_2$. During this process, forward flushing is usually provided in the region between the gasification device 132 and the gas lock 200, using sufficiently large quantities of pure nitrogen $R\text{-}N_2$ as the flushing medium over a fairly long period in order to ensure displacement of the synthesis gas SG from this region of the fuel system 129. The exhaust gas from the flushing procedure is led out of the gasification system 129 via the exhaust gas line 207 downstream of the gas lock 200.

The fuel system between the gas lock 200 and the combustion chamber 6 of the gas turbine 2 is flushed in the forward direction with pure nitrogen R-$N_2$. For this purpose, the pure nitrogen R-$N_2$ generated in the air separation installation 132 is supplied to the gas line 130 via the nitrogen line 228. Because of the small volume of this system, forward flushing with pure nitrogen R-$N_2$ is sufficient.

Due to the compact embodiment of the gas lock 200, comprising a quick-action valve 202, a pressure relief system 206, connected to a flare, and a gas lock valve 204, together with the arrangement of the gas lock 200 downstream of the synthesis gas SG after the heat exchanger 159, the flushing of the fuel system 129 necessary after the change of charge to the gas turbine 2 from synthesis gas SG to second fuel is particularly simple and can be carried out in a particularly short time. This is achieved by a comparatively small number, and a particularly favorable arrangement, of the components, so that the volume to be flushed is found to be particularly small.

The flushing is also necessary when running down the gas and steam turbine installation 1. In this case, it is found to be particularly favorable for nitrogen to be provided for flushing because the latter can be made available independently of the condition of the waste-heat steam generator 30. The gas and steam turbine installation 1 can, in consequence, be operated in a particularly reliable manner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gas and steam turbine installation comprising:
   a waste-heat steam generator, connected downstream of a gas turbine on the combustion-gas side, with heating surfaces connected into a water/steam circuit of a steam turbine; and
   a fuel system, connected upstream of a combustion chamber of the gas turbine, the fuel system including,
   a gasification device for fossil fuel,
   a gas line, branching off from the gasification device and opening into the combustion chamber of the gas turbine, and
   a gas lock, connected into the gas line upstream of the combustion chamber, the gas lock including,
   a gas lock valve;
   a flushing line for at least one of nitrogen flushing and flushing with an inert medium other than steam, opening into the gas line downstream of the gas lock valve, wherein the flushing line is connected to an intermediate reservoir.

2. The gas and steam turbine installation as claimed in claim 1, wherein a heat exchanger is connected into the gas line, upstream of the gas lock.

3. The gas and steam turbine installation as claimed in claim 1, wherein a saturator is connected into the gas line, upstream of the gas lock.

4. The gas and steam turbine installation as claimed in claim 3, wherein the saturator is arranged upstream of the heat exchanger.

5. The gas and steam turbine installation as claimed in claim 1, wherein the flushing line is adapted for flushing in the direction of the combustion chamber.

6. The gas and steam turbine installation as claimed in claim 1, wherein a supply line opens into the intermediate reservoir.

7. The gas and steam turbine installation as claimed in claim 6, wherein the intermediate reservoir is connected via the supply line, to an air separation installation.

8. The gas and steam turbine installation as claimed in claim 7, wherein a reserve line opens into the supply line, the reserve line being connected at the inlet end to an emergency filling system for nitrogen.

9. The gas and steam turbine installation as claimed in claim 2, wherein a saturator is connected into the gas line, upstream of the gas lock.

10. The gas and steam turbine installation as claimed in claim 9, wherein the saturator is arranged upstream of the heat exchanger.

11. The gas and steam turbine installation as claimed in claim 8, wherein the reserve line is connected at the inlet end to an emergency filling system for pure nitrogen.

12. The gas and steam turbine installation as claimed in claim 2, wherein the flushing line is adapted for flushing in the direction of the combustion chamber.

13. The gas and steam turbine installation as claimed in 12, wherein a supply line opens into the intermediate reservoir.

14. The gas and steam turbine installation as claimed in claim 13, wherein the intermediate reservoir is connected via a supply line, to an air separation installation.

15. The gas and steam turbine installation as claimed in claim 14, wherein a reserve line opens into the supply line, the reserve line being connected at the inlet end to an emergency filling system for nitrogen.

16. The gas and steam turbine installation as claimed in claim 3, wherein the flushing line is adapted for flushing in the direction of the combustion chamber.

17. The gas and steam turbine installation as claimed in claim 16, wherein a supply line opens into the intermediate reservoir.

18. The gas and steam turbine installation as claimed in claim 17, wherein the intermediate reservoir is connected via a supply line, to an air separation installation.

19. The gas and steam turbine installation as claimed in claim 18, wherein a reserve line opens into the supply line, the reserve line being connected at the inlet end to an emergency filling system for nitrogen.

20. The gas and steam turbine installation as claimed in claim 1, wherein the gas lock further includes, a quick-action valve, and at least one of a pressure relief and overpressure system.

21. A method for flushing a fuel system of a gas and steam turbine installation connected upstream of a combustion chamber of the gas turbine, the fuel system including a gas lock with a gas lock valve and a flushing line for at least one of nitrogen flushing and flushing with an inert medium other than steam, opening into the gas line downstream of the gas lock valve where the flushing line is connected to an intermediate reservoir, the method comprising:
   flushing the fuel in the direction of the combustion chamber, with at least one of nitrogen and an inert medium other than steam between the gas lock and the combustion chamber; and
   ensuring flushing via the intermediate reservoir.

22. The method as claimed in claim 21, wherein the gas lock includes a control valve and the flushing medium is supplied downstream of the gas lock, between the gas lock valve and the control valve.

23. The method as claimed in claim 22, wherein nitrogen is extracted from an air separation installation for flushing.

24. The method as claimed in claim 21, wherein a heat exchanger is connected into the gas line, upstream of the gas lock.

25. The method as claimed in claim 24, wherein the gas lock includes a control valve and the flushing medium is supplied downstream of the gas lock, between the gas lock valve and the control valve.

26. The method as claimed in claim 24, wherein nitrogen is extracted from an air separation installation for flushing.

27. The method as claimed in claim 21, wherein a saturator is connected into the gas line, upstream of the gas lock.

28. The method as claimed in claim 27, wherein the gas lock includes a control valve and the flushing medium is supplied downstream of the gas lock, between the gas lock valve and the control valve.

29. The method as claimed in claim 27, wherein nitrogen is extracted from an air separation installation for flushing.

30. The method as claimed in claim 22, wherein nitrogen is extracted from an air separation installation for flushing.

31. The method as claimed in claim 25, wherein nitrogen is extracted from an air separation installation for flushing.

32. The method as claimed in claim 28, wherein nitrogen is extracted from an air separation installation for flushing.

* * * * *